3,509,796
AIRCRAFT GROUND SUPPORT EQUIPMENT ACTUATOR
Bruce Osborne, Hayward, Calif., assignor to Malabar Manufacturing Company
Filed Oct. 21, 1968, Ser. No. 769,039
Int. Cl. F16j 9/00, 15/50, 15/32
U.S. Cl. 92—251                9 Claims

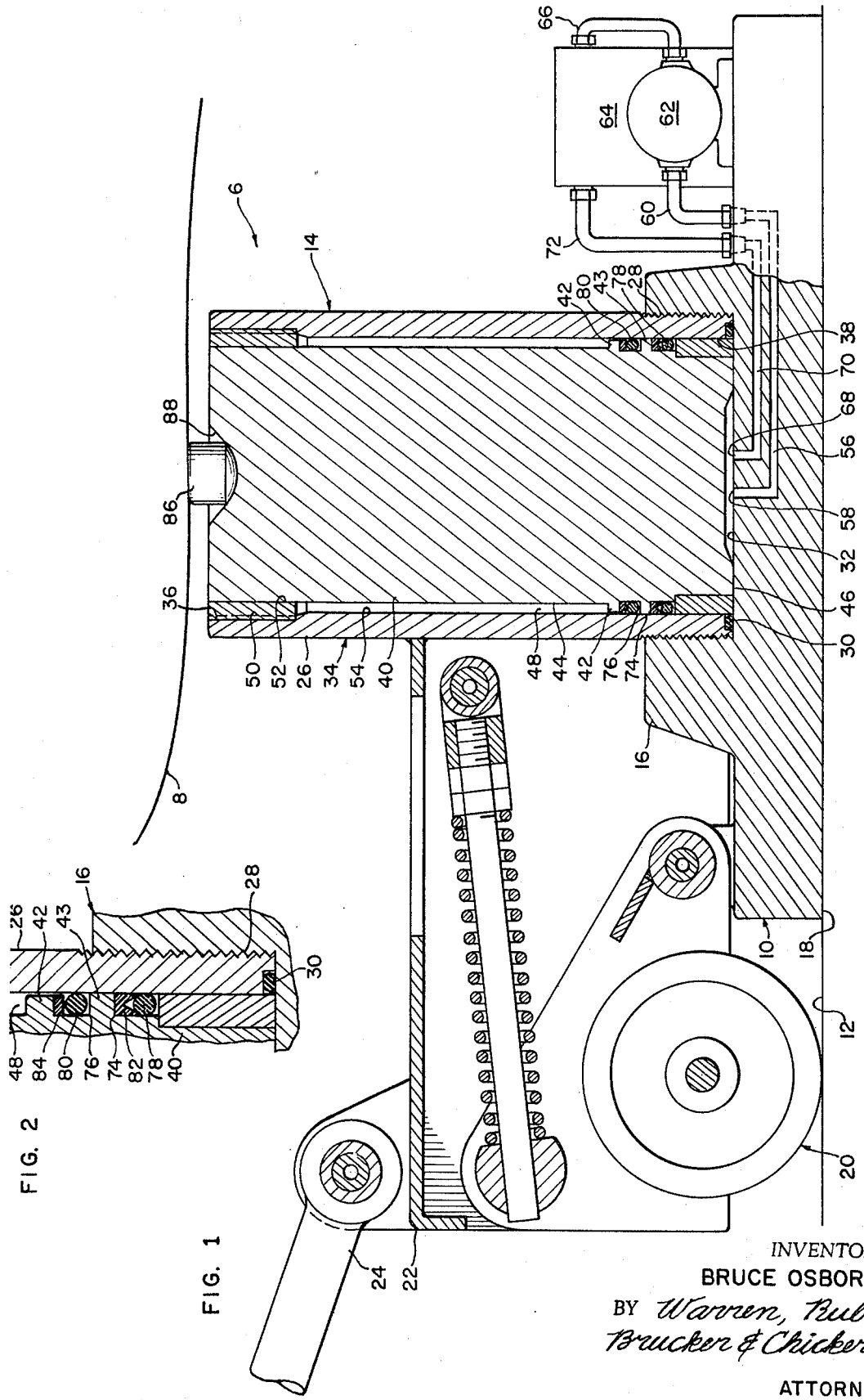

ABSTRACT OF THE DISCLOSURE

A hydraulic actuator for use in aircraft ground support equipment having a support structure resting on the ground, a hydraulic cylinder mounted to the support structure and a piston ram axially movably disposed in the cylinder. One end of the cylinder is open to enable the piston ram to be extended therethrough. A closed end of the cylinder includes ports for connection to a source of pressurized hydraulic actuator fluid, and a first packing ring, disposed in the annular space between the piston ram and the cylinder, seals the closed end of the cylinder from the open end. The first packing ring is constructed of a material which is chemically inert to the actuator fluid. A second packing ring, also disposed in the annular space between the piston ram and the cylinder walls, is positioned between the first packing ring and the open end of the cylinder and is constructed of a material chemically inert to non-petroleum based, fire resistant aircraft fluids that can enter the annular space between the piston ram and the cylinder walls. The second ring prevents the aircraft fluids from damaging the first packing ring.

BACKGROUND OF THE INVENTION

This invention relates to hydraulic actuators for use in aircraft ground support equipment and more particularly to hydraulic jacks having axially positioned piston cylinders formed with an open end to allow extension of piston rams therethrough.

Today's small, private aircraft as well as large commercial and military aircraft require a great variety of ground support equipment for their proper care and maintenance. If such equipment moves parts of or the whole aircraft, such as the hoisting of the aircraft off the ground for test, inspection, or replacement operations, hydraulic actuators are employed to generate the necessary forces. Hydraulic jacks for lifting the aircraft off the ground, which engage the aircraft at various points of its body, wings, or landing gear, are perhaps the most commonly used ground support equipment.

Such jacks, for example, employ relatively low cost and readily available petroleum based hydraulic actuator fluids for moving a piston ram in a cylinder. Conventional O rings are usually employed for sealing the pressurized portion of the cylinder from the remainder thereof, and such arrangements operate in a generally satisfactory manner and are relatively inexpensive to construct. Deterioration of the seal rings and an eventual loss of the seal between the pressurized and unpressurized portions of the cylinder, however, will occur when the jacks are used for aircraft which employ certain fluids in their hydraulic systems. Non-petroleum based hydraulic fluids from the aircraft can attack the seal ring in the hydraulic actuator of the jack. Such non-petroleum based fluids are now commonly used since they are non-flammable and thereby eliminate a fire hazard in the aircraft.

Such non-petroleum based hydraulic aircraft fluids frequently leak from joints, ports and fittings of the aircraft, particularly when the jack is placed beneath the landing gear of the aircraft. The fluid can then enter the annular space between the piston ram and the cylinder walls at the open end of the jack, contact the seal ring of the hydraulic actuator, and chemically attack it, which results in the loss of the seal. Therefore, the actuators must frequently be disassembled to replace the seal ring. This is time consuming and economically wasteful.

Attempts have been made to find materials which resist attack and damage from both the petroleum-based hydraulic actuator fluid of the jack and the non-petroleum based, non-flammable hydraulic fluid of the aircraft. Although there are materials which are chemically inert to both fluids, the required mechanical properties of the seal ring rule out their use. More particularly, the seal rings must have a relatively high degree of flexibility to establish a seal at low wintertime temperatures and at pressures varying from zero to the maximum operating pressure of the jack. The seal rings must further resist so-called "cold flow." Cold flow permanently deforms the material and, if it takes place, often results in a loss of the seal after relatively short service periods. Known materials having the desired chemical resistance against both fluids, however, do not exhibit the desired mechanical properties and are, therefore, unuseable. Thus, prior aircraft ground support hydraulic actuators, and particularly hydraulic aircraft jacks, have employed resilient packing rings which are chemically inert to the hydraulic fluid in the jack but which are susceptible to attack and damage by hydraulic aircraft fluids.

SUMMARY OF THE INVENTION

The present invention provides a hydraulically actuated ground support apparatus for aircraft. Briefly, the apparatus comprises a support structure for placement on a supporting surface and a hydraulic actuator mounted to the support structure and adapted to be connected to a source of pressurized hydraulic, petroleum-based actuator fluid. The hydraulic actuator has a cylinder with an open end and a piston ram axially movably disposed in the cylinder and extensible through the open end of the cylinder upon introduction of pressurized actuator fluid into the cylinder at the other closed end thereof. A first packing ring is disposed between the piston ram and the cylinder wall and seals the annular space between the two to prevent actuator fluid from passing toward the open end. The first packing ring is constructed of a flexible material resisting chemical attack by and damage from the actuator fluid. A second packing ring is likewise disposed between the piston ram and the cylinder wall and is positioned intermediate the first packing ring and the open end of the cylinder. The second packing ring is constructed of a flexible material which resists chemical attack by and damage from fire resistant, non-petroleum based fluids leaking from the aircraft.

Thus, the first packing ring, which is preferably an O ring constructed of buna-N synthetic rubber, is shielded from contact by the aircraft fluid to prevent it from being damaged by such fluid. Likewise, the second packing ring, which is the preferred embodiment is also an O ring but is constructed of ethylene propylene or butyl rubber, is shielded from coming in contact with the actuator fluid by the first packing ring to prevent such fluid from chemically attacking and damaging the second packing ring. As a result, replacement of the packing rings in hydraulic actuators for aircraft ground support equipment due to the deterioration of the packing rings from contact with non-petroleum based hydraulic aircraft fluid is virtually eliminated.

Furthermore, the materials of which the packing rings are constructed can be selected to provide the desired flexibility and resiliency during all operating conditions and to prevent troublesome cold flow.

BRIEF DESCRIPTION OF THE DRAWING

FIG. 1 is a side elevational view, partially in section, of a hydraulic jack constructed according to the present invention;

FIG. 2 is an enlarged fragmentary view in cross section, of the seal mounting portion of the jack of the present invention.

DESCRIPTION OF THE PREFERRED EMBODIMENTS

Referring to the drawing, a hydraulically actuated ground support apparatus, such as a jack 6, for an aircraft 8 comprises a support structure 10 resting on ground 12 and a hydraulic actuator, generally designated 14, mounted to the support structure. The support structure includes base 16, having a flat underside 18 supported by the ground, and retractable casters 20 for movement of the jack. The support structure further includes a bracket 22 upon which pivotally mounted draw bar 24 is secured for pushing or pulling of the jack or, if the jack is relatively large and heavy, for connection to a suitable towing vehicle (not shown).

In a preferred embodiment of the invention, the hydraulic actuator is comprised of peripheral wall or sleeve, 26, preferably having a circular cross section and external thread 28 which engages an internal thread in a circular recess defined by base 16. The peripheral wall 26 may be formed of non-circular cross sections and the apparatus of of the present invention will exhibit the advantages set forth herein providing the remaining rings, etc. are correspondingly shaped. Seal ring 30 seals the space defined by the interior of the sleeve and end face 32 of base 16 from the exterior of the sleeve and the base. Thus, the base and the sleeve define a sealed hydraulic cylinder 34 which is vertically oriented when underside 18 of the base is supported on level ground 12 and which further defines a closed end 38 and an upwardly facing open end 36.

A cylindrical piston ram 40, which may alternatively be comprised of a plurality of telescopically stacked cylinders and a piston ram in the center thereof (not shown) is axially movably disposed on the interior of sleeve 26. An annular shoulder 42 of the cylindrical outer surface of the piston ram adjacent an inner end 46 thereof has a diameter slightly less than the diameter of the inner surface of sleeve 26, while a remainder 44 of the piston ram is recessed and has a lesser diameter than shoulder 42. Thus, there is an annular space 48 between the sleeve and the piston ram extending over substantially the full length of the hydraulic cylinder.

A ring-shaped insert 50 threadably engages sleeve 26 adjacent open end 36 of the hydraulic cylinder 34 and has an inner surface 52 which is of a diameter slightly greater than the diameter of the body 44 of piston ram 40. Portion 42 which engages surface 54 and body portion 44 engages inner surface 52 of insert 50 to provide guided motion of the piston ram during its axial movements in cylinder 26. Moreover, removal of insert 50 allows the passage of shoulder 42 of piston ram 40 into sleeve 26 during the assembly of the hydraulic actuator. When the insert is threaded into sleeve 26, it locks the piston ram to the sleeve and prevents the former from moving past open end 36 of the latter.

Base 16 further includes an intake conduit 56 which terminates at end face 32 and there forms an intake port 58. The intake conduit is in fluid communication with tubing 60 connected to hydraulic pressure pump 62, which has a suction intake (not shown) communicating with a reservoir 64 via conduit 66. An outlet port 68 in base 16 is further connected with the reservoir through an outlet conduit 70 and tubing 72. Suitable valving (not shown) permits the selective blocking of the fluid communication between intake port 58 and pump 62, and between outlet port 68 and reservoir 64. Thus, pressurized hydraulic fluid can be introduced into the hydraulic cylinder 34 adjacent closed end 38 thereof and can be maintained therein by closing the valving connecting the hydraulic cylinder with the pump and the reservoir. The pressure in the hydraulic cylinder is relieved by opening the valving to establish flow communication between outlet port 68 and reservoir 64.

The advantageous double seal construction of the actuator of the present invention may best be understood by reference to FIG. 2. First and second grooves or recesses 74 and 76 are formed in exterior surface of piston ram 40 adjacent shoulder 42 and define a second shoulder 43. These recesses allow for placement of first and second packing rings, such as O rings 78 and 80, in the annular space between the piston ram and the wall of sleeve 26. Pressurized hydraulic fluid introduced into hydraulic cylinder 34 adjacent closed end 38 is thereby prevented from passing from the closed end of the hydraulic cylinder, through annular space 48 between the piston ram and sleeve 26 and to the open end 36 of the hydraulic cylinder 34. Also disposed in the grooves are first and second back-up rings 82 and 84 which prevent extrusion of the O ring into the narrow annular space between sleeve 26 and shoulders 42 and 43 under large hydraulic pressures acting on the O rings.

For use on aircraft 8, jack 6 is positioned beneath a jack pad 86 of the aircraft so that an indentation 88 in piston ram 40 is aligned with the jack pad. Hydraulic pump 62 is then actuated to pressurize the space of the hydraulic cylinder beneath the piston ram and thereby extend the piston ram upwardly past open end 36 into engagement with the jack pad to thereby lift the aircraft off the ground for servicing, maintenance, testing, etc. of the aircraft.

It is highly desirable to use a conventional, inexpensive and readily available petroleum-based oil or hydraulic fluid in the hydraulic system of jack 6. Such fluid is placed in reservoir 64 and circulated through the hydraulic system of the jack by pump 62. To prevent the petroleum based hydraulic actuator fluid from chemically attacking first O ring 78, the latter is constructed of a material which is chemically inert to such actuator fluid and which exhibits the desired physical characteristics. To assure a proper seal of the first O ring under zero, as well as under maximum hydraulic pressure, and under all encountered temperature variations from sub-zero winter temperatures to 100° F. plus summer temperatures, the O rings are constructed of rubber and have a hardness of about 70 on the durometer hardness scale for resilient rubber products. This provides the O ring with sufficient flexibility and resiliency during axial movements of piston ram 40 in cylinder 26 to provide a positive seal, assures sufficient flexibility and resiliency of the O ring even under lowest temperatures, and prevents extrusion of the O ring into the annular space between the piston ram and sleeve due to excessive softness of the material of which it is constructed.

Chemically, the first O ring 78 is constructed of a rubber compound which is inert to, i.e. which is not chemically attacked and damaged by, petroleum based hydraulic actuator fluids. It is presently preferred to use buna N synthetic rubber, the scientific term for which is butadiene-acrylonitrile rubber, a widely available copolymer inert to petroleum based fluids.

The second O ring must be formed to meet different performance criteria than the first. To reduce the fire hazard on aircraft, hydraulic systems of the aircraft now generally employ a fire resistant, non-petroleum based hydraulic aircraft fluid, which during servicing, testing and maintenance work frequently leaks from the aircraft and may thus fall onto jack 6. One such aircraft fluid presently in wide use in sold by the Monsanto Chemical Corporation of St. Louis, Mo. under the trademark Skydrol. The exact chemical composition of that fluid is a trade secret of the Monsanto Chemical Corporation and is, therefore, not known to the public. Its characteristics, however, are well known, and it has been found that such fire resistant, non-petroleum based hydraulic fluid attacks those known rubbers which are chemically inert to petroleum based fluids. On the other hand, those known rubber compounds, such as ethylene propylene or butyl rubber, which are chemically inert to such fire resistant, non-petroleum based hydraulic aircraft fluids, are chemically attacked and damaged by the petroleum based fluids. Consequently, if only one O ring is employed, such as O ring 78, it will be chemically attacked by hydraulic aircraft fluid entering the annular space 48 between piston ram 40 and cylinder 26 if the O ring is constructed of rubber compounds such as buna-N. The seal established by the first O ring can thus be lost after often relatively short service periods. This, then, requires the disassembly of jack 6 to remove the damaged O ring and replace it with a new one. If a single O ring is used and it is constructed of a rubber compound not attacked by such aircraft fluid, the hydraulic fluid in the hydraulic system of the jack would attack the O ring, and it would again cause a loss of the seal.

To shield first O ring 78 from contact with such aircraft fluid, second O ring 80 is provided in the jack of the present invention and positioned between the first O ring and the open end 36 of hydraulic cylinder 34. The second O ring is constructed of a rubber compound, such as the above-mentioned ethylene propylene or butyl rubber, which is chemically inert to such hydraulic aircraft fluid. Hydraulic aircraft fluid entering annular space 48 is thus kept out of contact with first O ring 78. The second O ring is constructed of a material having substantially the same physical and mechanical properties with respect to their flexibility, resiliency, hardness, etc., as the rubber compound of which the first O ring is constructed. The second O ring is shielded from coming into contact with petroleum based hydraulic fluid from the hydraulic system of the jack by first O ring 78 and the first O ring is shielded from the hydraulic fluid of the aircraft by the second O ring.

To prevent extrusions of the O rings under high pressures, the backup rings 82 and 84 are provided. Since the backup rings do not require the resiliency of the O rings, they can be constructed of plastic materials, such as the one sold by the Du Pont de Nemours & Company of Wilmington, Del., under the trademark Teflon, which is chemically inert to both petroleum based hydraulic fluids and the fire resistant hydraulic aircraft fluids. The backup rings have a greater hardness and lesser flexibility and resiliency than the O ring material to provide the desired strength. The backup rings are positioned on the side of the O rings facing toward the open end 36 of the hydraulic cylinder 34. The first backup ring 82 is V-shaped to provide it with greater strength for the support of the first O ring 78 which is subjected to the high hydraulic pressure while the second backup ring may be flat since it does not experience any hydraulic pressure under normal operation of the jack. Other materials, such as leather, for example, which are also chemically inert to both the non-petroleum based aircraft hydraulic fluid and the petroleum based hydraulic actuator fluid, can, of course, be used.

Hydraulic actuators for aircraft ground support equipment constructed according to the present invention are trouble free in operation and require a minimum of maintenance. No great care need be exercised to prevent aircraft hydraulic fluid from entering the actuator since the pressure seal ring for the pressurized hydraulic fluid in the actuator is at all times shielded from coming into contact with the hydraulic aircraft fluid. This enables the use of low cost hydraulic fluid in the actuator.

Although the hydraulic actuator constructed according to the present invention has been shown as employed in a lifting jack, its advantages are, of course, equally available in hydraulic actuators for other aircraft ground support equipment such as tire removal dollies for aircraft (not shown).

What is claimed is:
1. A hydraulically actuated apparatus comprising:
  (a) a hydraulic cylinder formed with a peripheral wall terminating in an open end and a closed end;
  (b) a piston ram axially movably disposed in said cylinder and defining an annular space between the internal surface of said cylinder wall and the external surface of said ram, said ram being extensible through the said open end of said cylinder, said cylinder being formed at said closed end to allow the introduction of hydraulic actuator fluid under pressure between said closed end and said ram to effect extension of said ram through said open end;
  (c) a first packing ring disposed between said ram and cylinder and formed to provide a seal in said annular space, said ram and cylinder being formed to retain said first packing ring in sealed relation therewith during axial reciprocation of said ram to prevent said actuator fluid from passing from said closed end toward said open end, and said first packing ring being constructed of a material resisting chemical attack by or damage from said actuator fluid; and
  (d) a second packing ring disposed between said ram and said cylinder intermediate said first packing ring and said open end, said second packing ring being formed to provide a second seal in said annular space, said ram and cylinder being formed to retain said second packing ring in sealed relation therewith during axial reciprocation of said ram and said second packing ring being constructed of a material other than the material of said first packing ring and a material which is further selected to resist chemical attack by and damage from fire resistant non-petroleum based fluid whereby non-petroleum based fluid entering said open end is prevented from contacting said first packing ring.

2. Apparatus according to claim 1 wherein said cylinder is mounted on a support structure formed to rest on a substantially horizontal surface and position said cylinder in an upright orientation so that the open end faces in a vertical direction.

3. Apparatus according to claim 1 wherein said second packing ring is constructed of a material selected from the group consisting of ethylene propylene and butyl rubber.

4. Apparatus according to claim 1 wherein said first packing ring is constructed of a butadiene-acrylonitrile rubber.

5. Apparatus according to claim 1 wherein said cylinder and ram are circular in cross section and the exterior cylindrical surface of said ram includes a pair of axially spaced annular grooves, and wherein said packing rings have a circular cross section and are disposed in said grooves in said ram.

6. Apparatus according to claim 5 wherein said packing rings are constructed of a resilient, flexible material, and including back-up rings disposed in said grooves on the side of said packing rings facing toward said open end of said cylinder, said back-up rings being constructed of a material having a greater hardness and lesser flexibility than the material of which said packing rings are constructed, said back-up rings being further constructed of a material inert to the actuator fluid and the non-petroleum based fluid.

7. A hydraulic jack for lifting aircraft off the ground during inspection, maintenance and testing of the aircraft, comprising:
  (a) a support structure adapted to rest on a supporting surface,
  (b) an elongated hydraulic cylinder having a cylindrical cross section, being connected to the support structure, and having an open end and a closed end, the open end of the cylinder facing away from the supporting surface when the support structure rests thereon, the cylinder further being formed with an inlet port for introducing a pressurized, petroleum-based hydraulic actuator fluid into the cylinder, and an outlet port for withdrawing the actuator fluid from the cylinder, the ports being located adjacent the closed end of the cylinder, (c) a piston ram axially movably disposed in the cylinder and extensible past the open end when pressurized actuator fluid is introduced into the cylinder, an end of the ram extensible past the open end being formed to engage a portion of the aircraft, the ram further including a pair of axially spaced annular grooves on its exterior surface adjacent another end of the ram, (d) a first packing ring disposed in the groove closest to the other end of the ram and constructed of a resilient material inert to petroleum-based fluids, (e) a second packing ring disposed in the groove further away from the other end of the ram and constructed of a resilient material inert to non-petroleum based, fire resistant hydraulic aircraft fluids of a hydraulic system of the aircraft, and (f) back-up rings constructed of a material inert to petroleum-based fluids and to the non-petroleum based aircraft fluids, having a lesser resiliency than the packing rings, and being disposed in the grooves and positioned on the side of the packing rings facing away from the other end of the ram, whereby said non-petroleum based aircraft fluids entering an annular space between the cylinder and the ram are prevented from contacting and chemically damaging the first packing ring to enable the continuous and seal tight operation of the hydraulic jack, and the petroleum-based actuator fluid is prevented from contacting and chemically damaging the second packing ring to maintain the separation of the first seal ring and the aircraft fluids.

8. A hydraulic jack according to claim 7 wherein the second packing ring is constructed of a material selected from the group consisting of ethylene propylene and butyl rubber, and wherein the first packing ring is constructed of butadiene acrylonitrile rubber.

9. A hydraulic jack according to claim 8 wherein the packing rings have a durometer hardness of about 70.

References Cited

UNITED STATES PATENTS

| | | | |
|---|---|---|---|
| 2,211,455 | 8/1940 | Caldwell | 92—251 XR |
| 2,749,195 | 6/1956 | Krüger | 277—193 XR |
| 2,825,590 | 3/1958 | Sutherland | 277—165 |
| 2,833,668 | 5/1958 | Dailey et al. | 277—189.5 XR |
| 2,894,793 | 7/1959 | Robinson | 277—58 |
| 3,351,350 | 11/1967 | Shepler | 277—188 XR |
| 3,375,016 | 3/1968 | Jellinek et al. | 277—58 |
| 3,429,555 | 2/1969 | Wrenshall | 277—58 XR |

MARTIN P. SCHWADRON, Primary Examiner

L. J. PAYNE, Assistant Examiner

U.S. Cl. X.R.

92—161, 249, 252; 277—58